United States Patent [19]

Müller et al.

[11] Patent Number: 4,980,441
[45] Date of Patent: Dec. 25, 1990

[54] LIQUID CRYSTALLINE BIS-CHLOROCARBONIC ACID ESTERS, A PROCESS FOR THEIR PREPARATION AND LIQUID CRYSTALLINE N-ALKYL POLYURETHANES AND POLYCARBONATES PREPARED FROM THEM

[75] Inventors: Hanns P. Müller, Gladbach; Bernhard Jansen, Koeln; Wolfgang Calaminus, Bonn; Rolf Dhein, Krefeld, all of Fed. Rep. of Germany

[73] Assignee: Bayer Aktiengesellschaft, Leverkusen, Fed. Rep. of Germany

[21] Appl. No.: 315,859

[22] Filed: Feb. 27, 1989

[30] Foreign Application Priority Data

Mar. 12, 1988 [DE] Fed. Rep. of Germany ....... 3808274

[51] Int. Cl.⁵ .............................................. C08G 77/04
[52] U.S. Cl. ...................................... 528/26; 528/196; 528/209; 528/288; 528/300; 528/370; 528/372
[58] Field of Search ................. 528/26, 196, 209, 288, 528/300, 370, 372

[56] References Cited

U.S. PATENT DOCUMENTS

| | | | |
|---|---|---|---|
| 2,731,445 | 1/1956 | Wittbecker | 260/47 |
| 3,391,111 | 7/1968 | Morgan | 260/47 |
| 3,729,447 | 4/1973 | Haberland | 528/196 |
| 4,222,910 | 9/1980 | Tokuda | 524/156 |

FOREIGN PATENT DOCUMENTS

| | | |
|---|---|---|
| 0152217 | 1/1985 | European Pat. Off. . |
| 0146880 | 3/1985 | European Pat. Off. . |
| 2123175 | 5/1971 | Fed. Rep. of Germany . |
| 2009494 | 9/1971 | Fed. Rep. of Germany . |
| 6268815 | 3/1987 | Japan ................... 528/209 |
| 1265107 | 3/1972 | United Kingdom . |

Primary Examiner—Melvyn I. Marquis
Assistant Examiner—Karen A. Hellender
Attorney, Agent, or Firm—Connolly and Hutz

[57] ABSTRACT

Liquid crystalline bis-chlorocarbonic acid esters are 4-hydroxybenzoic acid-(4′-hydroxyphenyl) esters corresponding to the following formula

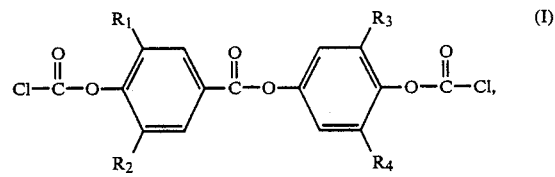

wherein $R_1$, $R_2$, $R_3$ and $R_4$ denote, independently of one another, hydrogen, a halogen atom or a $C_1$ to $C_6$ alkyl group. Preparation of (I) and liquid crystalline N-alkyl polyurethanes and polycarbonates prepared form (I) are other invention embodiments.

2 Claims, No Drawings

LIQUID CRYSTALLINE BIS-CHLOROCARBONIC ACID ESTERS, A PROCESS FOR THEIR PREPARATION AND LIQUID CRYSTALLINE N-ALKYL POLYURETHANES AND POLYCARBONATES PREPARED FROM THEM

This invention relates to new liquid crystalline bis-chlorocarbonic acid esters of 4-hydroxyphenyl esters of 4-hydroxybenzoic acids, their preparation and the liquid crystalline N-alkyl polyurethanes and polycarbonates prepared from them.

Bis-chlorocarbonic acid esters to numerous bis-hydroxy compounds are already known, e.g. the bis-chlorocarbonic acid esters of 2,2-bis-(4-hydroxyphenyl)-propane, 1,1-bis(4-hydroxyphenyl)-cyclohexane, bis-(4-hydroxyphenyl)-sulphide and hexahydrofuro(3,2-b)furan-3,6-diols (see e.g. Makromol. Chem. 57 1-11, 1962 and EP-B-0 025 937).

It has now been found that bis-chlorocarbonic acid esters which are derived from 4-hydroxyphenyl esters of 4-hydroxybenzoic acids have particularly advantageous properties. It was found that these bis-chlorocarbonic acid esters are in themselves liquid crystalline compounds and that they transfer this property to the N-alkyl polyurethanes and polycarbonates prepared from them by a reaction with disecondary diamines or dihydroxy compounds.

These N-alkyl polyurethanes obtainable from bis-chlorocarbonic acid esters of 4-hydroxybenzoic-acid-(4'-hydroxyphenyl) esters not only have the advantages of N-alkyl polyurethanes such as high heat resistance but thanks to their LC properties they also have improved flow properties in the melt and are therefore more easily processed, in particular to form thin walled moulded parts. They also have increased dimensional stability under heat and an increased modulus of elasticity as well as excellent chemical resistance, high flame resistance and good compatability for fillers. The same also applies to the polycarbonates obtainable from the bis-chlorocarbonic acid esters of 4-hydroxybenzoic acid-(4'-hydroxyphenyl)-esters. The properties described above of N-alkyl polyurethanes and polycarbonates obtainable from bis-chlorocarbonic acid esters of 4-hydroxybenzoic acid-(4'-hydroxyphenyl)-esters are of great practical importance for polyurethanes and polycarbonates which are to be used for moulded parts which are to be subjected to severe mechanical and thermal stresses. The polyurethanes and polycarbonates obtainable from the said chlorocarbonic acid esters provide the possibility of obtaining polymers suitable for fields of application for which synthetic resins have not hitherto been usable. This invention therefore relates to bis-chlorocarbonic acid esters of 4-hydroxybenzoic acid-(4'-hydroxyphenyl) esters corresponding to the following formula

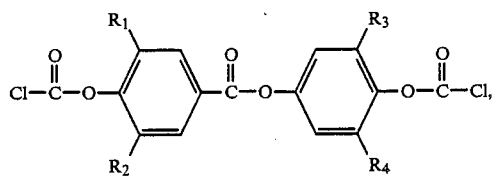

wherein
$R_1$, $R_2$, $R_3$ and $R_4$ denote, independently of one another, hydrogen, a halogen atom, preferably a chlorine or bromine atom, or a $C_1$ to $C_6$ alkyl group, preferably a $C_1$ to $C_4$ alkyl group.

The invention further relates to a process for the preparation of the bis-chlorocarbonic acid esters of Formula (1). In the process 4-hydroxybenzoic acid-(4'-hydroxyphenyl) esters corresponding to the following formula

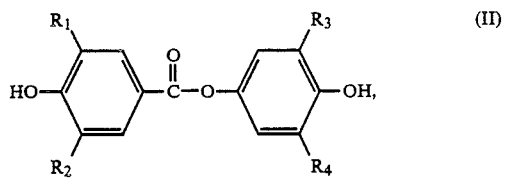

in which
$R_1$, $R_2$, $R_3$ and $R_4$ have the meanings given for Formula (1) are reacted with phosgene in the presence of acid binding agents by the method known for the reaction of phosgene with phenols.

The reaction may be carried out in organic solvents which are immiscible with water and inert under the reaction conditions, such as toluene or methylene chloride, using acid binding agents which are insoluble in these solvents, e.g. organic bases such as dimethyl aniline, or using acid binding agents which are insoluble in or immiscible with these solvents, such as $NaHCO_3$ or aqueous sodium hydroxide solution. It is surprisingly found that although 4-hydroxybenzoic acid-(4'-hydroxyphenyl) esters of Formula (11) are not liquid crystalline compounds, their reaction with phosgene gives rise to bis-chlorocarbonic acid esters which have LC properties.

The 4-hydroxybenzoic acid-(4'-hydroxyphenyl) esters of Formula (II) required as starting compounds for the preparation of the bis-chlorocarbonic acid esters according to the invention of Formula (I) and the preparation of these esters of Formula (11) are described in DE-OS 3 622 611 or may be obtained by methods described in the said publication.

The invention further relates to the polyurethanes and polycarbonates obtained from the reaction of the liquid crystalline bis-chlorocarbonic acid esters of Formula (1) with disecondary diamines or dihydroxy compounds corresponding to the following formula $$HX\text{-}A\text{-}XH \qquad (III)$$

in which
X stands for oxygen or a N(R) group wherein
R denotes a $C_1$ to $C_4$ alkyl group, preferably a methyl group, or together with R of the second N(R) group forms an ethylene group optionally substituted by a $C_1$ to $C_4$ alkyl group,. and
denotes a divalent residue of an aliphatic hydrocarbon, preferably an α,ω-alkylene residue, optionally interrupted by oxygen and/or silicon atoms and/or by a $N(C_1\text{-}C_4$ alkyl) group, or the divalent residue of an aromatic hydrocarbon, under the condition that A has an average molecular weight $\overline{M}$ below 600, preferably from 28 to 600.

The polyurethanes and polycarbonates according to the invention contain structural units corresponding to the following formula

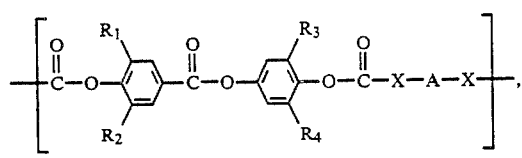  (IV)

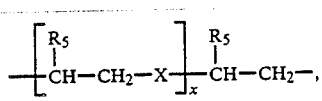  (V)

wherein
R₁, R₂, R₃ and R₄ have the meanings given for Formula (1) and
X and A have the meanings given for Formula (III).

For the LC properties of the polyurethanes and polycarbonates containing structural units of Formula (IV), it is essential that the proportion by weight of the structural units corresponding to the following formula

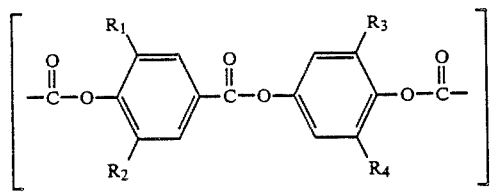

based on the total weight of the polymers is from 25 to 90% by weight, preferably from 30 to 85% by weight. For obtaining as much as possible high molecular weights, it is advantageous to use the chlorocarbonic acid esters according to the invention corresponding to Formula (I) and the diamines and dihydroxy compounds corresponding to Formula (III) in a molar ratio of about 1:1.

When mixtures of diamines and dihydroxy compounds of Formula (III) are used, the products obtained are LC polymers which contain both urethane and carbonate structural units (X=N(R) and O).

The reaction of the bis-chlorocarbonic acid esters according to the invention corresponding to Formula () with the diamines and dihydroxy compounds of Formula (1) is preferably carried out in an organic solvent which is immiscible with water and inert under the reaction conditions, in the presence of acid binding agents at temperatures of from −10° to +20° C.

The acid binding agents used may be inorganic bases such as NaHCO₃, organic bases such as triethylamine or mixtures of inorganic and organic bases. Suitable organic solvents which are inert under the reaction conditions are in particular aliphatic chlorinated hydrocarbons such as methylene chloride and ethylene chloride.

The diphasic system of methylene chloride/water is preferably employed.

After the reaction mixtures have been worked up by separation of the organic phase, removal of the monomolecular compounds present in the organic phase by washing with water, drying and removal of the solvent, the polymer is obtained in the form of a transparent solid which has the property of a synthetic material.

The divalent groups denoted by A may be aliphatic hydrocarbons in which the carbon chain may be interrupted by oxygen and/or silicon atoms and/or by N(alkyl) groups, for example the following: C₂ to C₄ alkylene groups such as ethylene, propylene-(1,3) and butylene-(1,4); or the residues of alkylene polyethers and polyamines corresponding to the following formula wherein
R₅ stands for hydrogen or methyl,
has the meaning indicated for Formula (1) and
x stands for an integer of from 10 to 40;
and the residues of polysiloxanes corresponding to the following formula $$-(CH_2)_n-CH_2-\left[\begin{array}{c}CH_3\\|\\Si-O\\|\\CH_3\end{array}\right]_y-Si-CH_2-(CH_2)_n-,$$  (VI)

wherein
n stands for 0 or 1 and
y stands for an integer of from 5 to 25 when n =0 and for an integer of from 10 to 40 when n =1.

In view of the requirement that A should have an average molecular weight M of less than 600, preferably from 28 to 600, it is evident that disecondary diamines derived from residues of high molecular weight alkylene polyethers and polyamines of Formulae (V) and (VI) and dihydroxy compounds corresponding to Formula (III) may only be used in admixture with low molecular weight disecondary diamines and/or dihydroxy compounds of Formula (11) and that the proportion of high molecular weight compounds of Formula (111) in this mixture must be such that the molecular weight of A has an average value of from 28 to 600.

The following are examples of divalent residues of aromatic hydrocarbons suitable as A: The phenylene-(1,4) and the naphthylene-(1,5) group and groups in which two or more phenylene groups are linked together in the 1,4 position by way of oxygen, sulphur, a sulphone group, a carbonyloxy group or an alkylene group. The following are examples of groups:

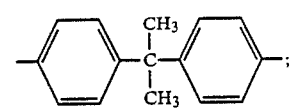

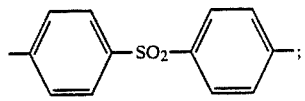

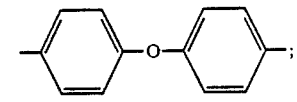

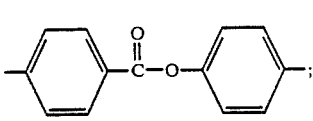

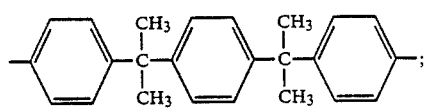

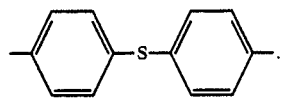

The following are examples of compounds of Formula (III): disecondary diamines (X=N(R)) such as ethylene diamine, propylene diamine, piperazine, 2,5-dimethyl piperazine, N,N'-dimethyl ethylene diamine, N,N',N''-trimethyldiethylene triamine and N,N'-dimethyl-1,5-diaminonaphthalene; dihydroxy compounds (X=0) such as ethylene glycol, propylene glycol-(1,2), butane-1,4-diol, polyethylene and polypropylene glycols containing from 10 to 40 ethylene or propylene oxide units, and polydimethyl silanols containing from 5 to 25 Si(CH$_3$)-O units, as well as bisphenols such as those corresponding to the following formulae:

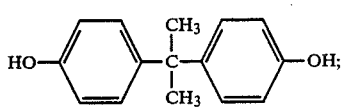

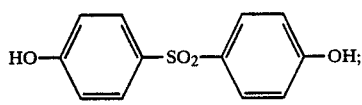

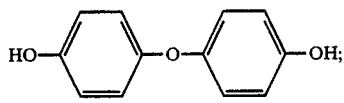

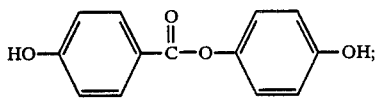

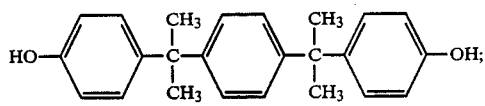

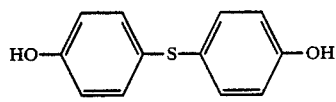

EXAMPLE 1

150 g of phosgene are slowly introduced at 0° C. into the suspension of 100 g of 4-hydroxybenzoic acid-(4'-hydroxyphenyl) ester in 500 ml of toluene. The reaction mixture is cooled to −5° C. and 121 g of dimethyl aniline are added dropwise at this temperature. After the reaction mixture has then been left to react for 30 minutes, it is left to cool to room temperature and stirred for 3 hours at this temperature. After the excess phosgene has been blown off with nitrogen, the reaction solution is washed, first with 10% hydrochloric acid and then several times with distilled water. The solution is dried and freed from the solvent. The solvent remaining behind is purified by recrystallization from cyclohexane.

118.6 g (=76.8% of the theory) of bis-chlorocarbonic acid ester are obtained in the form of colourless crystals.

M.P.:125 to 128° C.

Clarification point: 120° C. monotropic, liquid crystalline.

EXAMPLE 2

8.27 of the bis-chlorocarbonic acid ester obtained according to Example 1 are dissolved in 250 ml of methylene chloride. The solution is precooled to 0° C. and added with vigorous stirring to a solution, also cooled to 0° C, of 4.8 g of PiPerazine hexahydrate, 3.11 g of NaHCO$_3$ and 2 g of triethylamine in 250 ml of water. Stirring of the reaction mixture is then continued for 1 hour at 0° C. The organic phase is then separated, washed with water until neutral, dried and finally freed from solvent. The liquid residue is poured out on an aluminium sheet where it forms a solid, slightly cloudy film with the properties of a synthetic material after the last residues of solvent have evaporated off. Investigation of the film under a polarisation microscope shows that it has liquid crystalline properties in the temperature range of from 256 to 300° C. The Staudinger Index is 144.5 cm$^3$/g. The molecular weight determined by gel chromatography was found to be 60,000.

EXAMPLE 3

The procedure is the same as described in Example 2 except that a mixture of 4.55 g of piperazine hexahydrate and 1.8 of an α,ω-bis-methylamino-polysiloxane corresponding to the following formula $$CH_3NH-(CH_2)_2-O-[Si(CH_3)_2-O-]_{29.5}-(CH_2)-NHCH_3$$

is used instead of 4.8 g of piperazine hexahydrate.

A slightly cloudy, very flexible plastics film is obtained. Investigation of the film under a polarization microscope shows that it has liquid crystalline properties in the range of from 250 to 300° C. The Staudinger Index is 13.5 cm$^3$/g and the gel chromatographically determined molecular weight is 84,000.

EXAMPLE 4

The procedure is the same as described in Example 2 except that 5.75 g of 4-hydroxybenzoic acid-(4-hydroxyphenyl) ester are used instead of 4.8 g of piperazine hexahydrate. A clear, flexible plastics film is obtained. Investigation under the polarization microscope shows that it melts at 220° C. and has liquid crystalline properties in the range of from 240 to 350° C.

EXAMPLE 5

The procedure is the same as described in Example 2 except that a mixture of 2.43 g of piperazine hexahydrate and 2.88 g of 4-hydroxybenzoic acid-(4-hydroxyphenyl) ester is used instead of 4.8 g of piperazine hexahydrate. A solid, flexible plastics film is obtained. Investigation under the polarization microscope shows that the product has a melting point at 240° C. and liquid crystalline properties in the temperature range of from 240° C. to 350° C.

EXAMPLE 6

8.27 g of the bis-chlorocarbonic acid ester obtained according to Example 1 are reacted with 4.55 g of piperazine hexahydrate and 3.13 g of an α,ω-bis-(methylamino)-polypropylene glycol under the conditions described in Example 2 and using 4 g of NaHCO$_3$ and 2 g of triethylamine.

A solid, highly flexible and elastic plastic film is obtained.

Investigation under the polarization microscope shows that the product has a melting point of 160° C. and liquid crystalline properties in the temperature range of from 210° to 335°]C.

We claim:

1. Polyurethanes or polycarbonates containing structural units of the formula

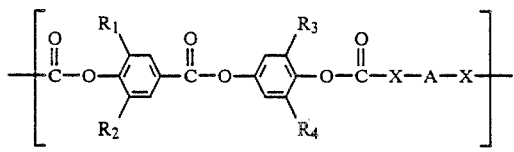

wherein X is an oxygen atom or —NR—,
R is $C_1$ to $C_4$-alkyl or, when in conjunction with the R of another —NR—, forms an ethylene group which is unsubstituted or substituted by $C_1$—$C_4$-alkyl,
A is a divalent aromatic hydrocarbon group, a divalent aliphatic hydrocarbon group or a divalent alphatic hydrocarbon group interrupted by oxygen, silicon or N—(C—$_{C4}$alkyl), with the proviso that A has an average molecular weight $\overline{M}$ below 600, and
$R_1$, $R_2$, $R_3$ and $R_4$, independent of one another, are each hydrogen, halogen or $C_1$ to $C_6$-alkyl,
and said polyurethanes and polycarbonates containing 25 to 90% by total weight of structural units of the formula

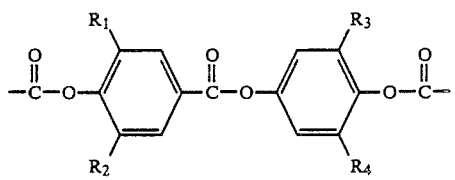

2. Polyurethanes or polycarbonates according to claim 1 obtained by the reaction of bis-chlorocarbonic acid esters of 4-hydroxybenzoic acid-(4'-hydroxyphenyl)-esters corresponding to the formula

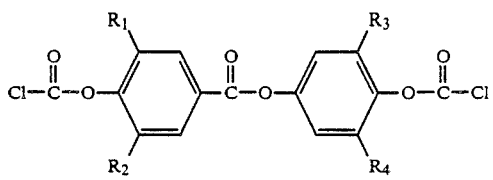

with secondary diamines or dihydroxy compounds corresponding to the formula HX-A-XH wherein
$R_1$, $R_2$, $R_3$ and $R_4$ are as defined in claim 1,
X is oxygen or a N(R) group,
R is a $C_2$ to $C_4$alkyl group or together with the R of a second N(R) group both R's denote an ethylene group or an ethylene group substituted by a $C_1$ to $C_4$ alkyl and
A is a divalent aliphatic aromatic hydrocarbon group, a divalent hydrocarbon group or a divalent aliphatic hydrocarbon group interrupted by oxygen, silicon or N($C_1$-$C_4$-alkyl), with the proviso that A has an average molecular weight $\overline{M}$ below 600.

* * * * *